Patented Sept. 28, 1954

2,690,398

UNITED STATES PATENT OFFICE 2,690,398

PIGMENT PREPARATIONS AND PROCESS OF MAKING SAME

Peter Guertler, Basel, and Andreas Ruperti, Arlesheim, Switzerland, assignors to Ciba Limited, Basel, Switzerland, a Swiss firm No Drawing. Application June 12, 1950, Serial No. 167,705

Claims priority, application Switzerland June 16, 1949

17 Claims. (Cl. 106—165)

1

This invention relates to pigment preparations and to a process for the manufacture thereof.

It is known that a large number of pigments, of inorganic nature, such as $TiO_2$, and especially of organic nature, such as water-insoluble azo dyestuffs, for example of the type of the ice colors, and also vat dyestuffs of the indigoid, thioindigoid and anthraquinone series, copper phthalocyanine and others can be applied in spin dyeing processes for artificial silk and staple fiber from regenerated cellulose. It is also known that pigments of normal grain size, for example with average particle size of 20–500$\mu$, by suitable treatment can be brought to such a fine state of dispersion that in spinning they cause practically no disturbance. Thus, for example, it has already been proposed to subject kneadable masses, which contain as substance promoting kneadability an essential proportion of a substance possessing dispersing action, to a mechanical treatment with the addition of relatively little water, for example in a roller mill or a kneading apparatus of the Werner-Pfleiderer type. A fine dispersion of pigments can also be achieved by the treatment of an aqueous suspension thereof in a colloid or oscillation mill in the presence of substances possessing dispersing action. As substances of dispersing action are concerned for example sulfite cellulose waste liquor, which as is known may have an undesired accelerating influence on the ripening of viscose, or advantageously an alkali salt for example the sodium salt of a condensation product from formaldehyde and the naphthalene sulfonation mixture (usually termed dinaphthylmethane disulfonic acid) which contains a preponderating proportion of naphthyl-2-sulfonic acid. In this manner in many cases pigments can be converted into such a state of dispersion that they do not prevent the spinning of viscose solutions which are colored therewith. On account of the dispersing effect of the above mentioned substances such pigment preparations are also relatively stable on dilution with water, especially when it is possible to reduce the average particle size to about 1–5$\mu$.

It is further also known that many pigment preparations of the specified type under suitable conditions can be evaporated to dryness. After stirring the dry preparations obtained into water there is obtained again in many cases a dispersion of the pigment which has scarcely suffered any detrimental effect so far as fineness of the degree of distribution is concerned.

Unfortunately such dry preparations, in spite of their capacity for dispersion in water, as a rule are unsuitable for direct incorporation into viscose solution since even such dry preparations as are completely reversible with water without detrimental effect on the degree of dispersion, in most cases on direct incorporation into viscose solution exhibit pigment agglomerations, so that a viscose solution which has been colored by direct incorporation of such a dry preparation comprises coarse particles which disturb the spinning process or cause increased consumption of dyestuff and bad thread quality. There is therefore a need for dry pigment preparations which are dispersible again in their original degree of fineness not only on stirring into water but also on direct incorporation into viscose.

The present invention is based on the observation that dry pigment preparations with the desired properties can be produced when a pigment suspension is dried which contains the pigment in a degree of dispersion suitable for use in spin dyeing, dispersing agent and also such an ether-acid salt of a high polymeric carbohydrate as in 3 per cent aqueous solution possesses a viscosity of at least 0.5 poise at 25° C.

The pigment suspensions serving as starting materials in the present process can be produced in the above specified manner, that is to say by simple mechanical working on roller apparatus, kneading apparatus and the like or by grinding in so-called colloid mills, oscillation mills and the like in the manner known per se. In these methods of production there is obtained on dilution with water a pigment suspension which contains the pigment in a suitable state of dispersion for spin dyeing and also a dispersing agent. As dispersing agents there can be employed in addition to those set forth above also sodium N-benzyl-$\mu$-heptadecyl-benzimidazole disulfonate, sodium dibutylnaphthalene sulfonate, sodium naphthenate and condensation products from sulfonated phenol oil with urea and formaldehyde. Suitably the quantity of the dispersing agent is between about 20 and 75 per cent of the total dry weight and preferably between about 40 and 75 per cent, and advantageously the said quantity is further proportioned to about one-third to double the proportion of pigment. These pigment suspensions employed as starting materials according to the present invention are to be considered as sufficiently finely divided when in the suspension after dilution with water the majority of the pigment particles exhibit Brownian movement under the microscope. According to the present process instead of drying such a pigment suspension as such, drying is carried out after addition of an ether-acid salt of a high polymeric carbohydrate of the nature set forth above.

Under the expression "ether-acid of a high polymeric carbohydrate" are to be understood such derivatives of high polymeric carbohydrates as contain an ether-like bound alkyl radical which contains an acid group, as for example a carboxylic or sulfonic acid group. These ether-acids are employed in the form of their water-soluble salts, especially alkali metal salts but for the sake of simplicity will be referred to as ether-acids.

The ether-acid grouping can thus correspond to the general formula —O-alkylene-COOH or —O-alkylene-SO$_3$H, in which the alkylene radical advantageously contains less than four, for example at the most two, carbon atoms. The carboxylic acid ethers of cellulose or starch, as for example their glycollic acid or lactic acid ethers and also the analogous sulfonic acids, such as cellulose ethyl ether $\beta$-sulfonic acids have proved to be very suitable.

The viscosity of the ether-acid salts of high polymeric carbohydrates depends to a certain extent on the degree of substitution, that is to say on the number of acid groups present per glucose unit in the molecule. This degree of substitution can for example lie between about 0.3 and 1 and must in all cases be sufficiently great in order to guarantee the water-solubility of the salts employed, suitably alkali metal salts. Mainly however the viscosity depends upon the molecular size of the carbohydrate components. As already mentioned the viscosity of a three per cent. solution at 25° C. should amount to at least 0.5 poise. Besides the compounds derived from starch and cellulose this condition is in most cases fulfilled by derivatives of slightly degraded carbohydrates, for example British gum derivatives. The point at which the addition is made of the ether-acid salt of the high polymeric carbohydrate is of no particular importance. The addition can take place if desired shortly before or during the dispersing treatment. It is only of importance that the addition take place before the drying.

The quantity of the ether carboxylic acid or ether sulfonic acid salt of the high polymeric carbohydrate to be added can vary within relatively wide limits. Suitably there is employed however between 2 per cent. and 20 per cent. of these salts calculated on the dry content of the dispersion. Particularly advantageous results are frequently obtained in the case of quantities between 5 and 10 per cent. The drying of the pigment suspension provided with the addition according to the invention can be carried out for example in vacuum driers, ordinary pressure driers or advantageously in so-called spray driers.

The preparations obtained allow of a simple working in the coloring of viscose solutions and they are particularly desirable when it is not required to dilute the viscose solution to be used by addition of aqueous solutions or suspensions prior to the spinning process.

The products obtained were tested according to the following method for dispersibility on direct incorporation into viscose solution.

Into a beaker of 6 cm. diameter are introduced 100 grams of commercial viscose solution. The pigment preparation to be tested is sprinkled in and the whole stirred for exactly 15 minutes with a glass propeller agitator of a diameter of 5.5 cm. with four blades each 1.8 cm. wide and at an angle of 45° to the axis using a speed of 160 revolutions per minute. The separating distance of the agitator from the bottom of the beaker amounts to about 0.5 cm. Thereupon the viscose is de-aerated in vacuum and then allowed to stand for 15 hours in a cooler at about +4° C. Thereupon a test portion is taken from the viscose and formed into a thin film by pressing out between two glass plates. This film is precipitated in an ordinary acid precipitation bath and then examined under the microscope.

The following examples illustrate the invention, the parts and percentages being by weight:

*Example 1*

100 parts of a press cake of the dyestuff from diazotized 2-methyl-4-chloro-1-aminobenzene and 1-(2':3'-hydroxynaphthoyl)-amino-2-methyl-4-chlorobenzene with a content of 23.6 per cent. dyestuff, are heated on the water bath until about 25 parts of water are evaporated. The residue is thereupon thoroughly mixed with 40.2 parts of dinaphthylmethane-disodium sulfonate whereby a consistent paste is produced. The paste obtained is treated on a roller apparatus in which operation if the mass becomes viscous a little water may be added. The treatment on the roller apparatus should be continued until a dispersion suitable for spin dyeing is attained. Finally the treated material, advantageously on the roller apparatus itself, is diluted with so much water that a relatively mobile paste is produced. This paste contains the original pigment together with the incorporated dinaphthylmethane disodium sulfonate in the proportion 23.6:40.2 parts by weight, while the total quantity of the pigment, the dispersing agent and the water remains indeterminate since it is not possible to remove the treated material quantitatively from the roller apparatus. The dry content of the paste is thereupon determined and its composition then ascertained.

For purposes of comparison a test portion of the paste thus obtained is diluted with water to a dry content of 10 per cent. and dried in a spray drier. Thereupon 0.38 gram of the powder thus obtained is tested according to the method set forth by incorporation into a viscose solution. A portion of the paste obtained above is converted by addition of the calculated quantity of water and an aqueous solution of sodium cellulose glycollate (degree of substitution=0.7–0.8; viscosity of an aqueous 3 per cent. solution at 25° C. by Gardner's method=1.25 poises) into a dispersion of the following composition:

3.52 per cent. dyestuff pigment,
5.98 per cent. dinaphthylmethane-disodium sulfonate,
0.5 per cent. sodium cellulose glycollate,
90 per cent. water.

This dispersion is dried in a spray drier.

A further portion of the paste obtained above is converted by addition of an aqueous solution of sodium cellulose ethyl ether $\beta$-sulfonate (degree of substitution=0.7; viscosity of a 3 per cent.

aqueous solution at 25° C. by Gardner's method = 1.0 poise) and water into a dispersion of the following composition:

3.0 per cent. dyestuff pigment,
6.0 per cent. dinaphthyl methane disodium sulfonate,
1.0 per cent. sodium cellulose ethyl ether β-sulfonate,
90.0 per cent. water.

This dispersion is dried in a spray drier. 0.4 gram of each of the powders obtained is treated in an analogous manner by incorporating into viscose solution. Comparison of the films obtained shows that the product dried without addition of sodium cellulose glycollate or cellulose ethyl ether sulfonate exhibits in the viscose film obtained pigment agglomerations which are not produced in the case of the product dried with the addition of sodium cellulose glycollate or cellulose ethyl ether sulfonate.

An analogous result is obtained by the application of sodium cellulose lactate or of an ether of a slightly degraded starch (in the form of its sodium salt) obtained by etherification of British gum with chloracetic acid, with the corresponding properties.

The concentration of the dispersion which is dried in the spray drier is not critical provided that the viscosity permissible for spray drying is not exceeded. It can if desired be supplied to the spray drier in a still more dilute or in a considerably more concentrated form.

*Example 2*

25 parts of the dyestuff from diazotized 2:5-dichloro-1-aminobenzene and 1-(2'-hydroxy-3'-naphthoyl) - amino - 2:5 - dimethoxybenzene, 50 parts of dinaphthylmethane disodium sulfonate and 30 parts of water are mixed and the paste obtained treated on the roller apparatus as described in Example 1. After dilution and after carrying out the dry content determination, a dispersion of the following composition is produced by addition of water and sodium cellulose glycollate (dissolved in water):

3.07 per cent. dyestuff pigment,
6.13 per cent. dinaphthylmethane- disodium sulfonate,
0.8 per cent. sodium cellulose glycollate,
90.0 per cent. water and dried in a spray drier. The testing of 0.27 gram of the powder obtained according to the method set forth above shows a good dispersion of the pigment in the viscose film. On the other hand the testing of 0.25 gram of a product dried in a corresponding manner without addition of sodium cellulose glycollate shows pigment agglomerations in the viscose film.

*Example 3*

A mixture of 40 parts of copper phthalocyanine, 40 parts of dinaphthylmethane-disodium sulfonate and 40 parts of water is treated on the roller apparatus as described in Example 1. With a portion of the product from the roller by addition of the calculated quantity of water and dinaphthylmethane disodium sulfonate a paste is produced with the following composition:

4.04 per cent. dyestuff pigment,
5.96 per cent. dinaphthylmethane disodium sulfonate,
90.0 per cent. water.

This dispersion is dried in a spray drier and 0.25 gram of the product obtained is tested by the method set forth above by incorporation into viscose solution.

The major quantity of the product from the roller, with addition of water, dinaphthylmethane disodium sulfonate and an aqueous solution of sodium cellulose glycollate is converted into a dispersion of the following composition:

4.04 per cent. dyestuff pigment,
5.26 per cent. dinaphthylmethane disodium sulfonate,
0.7 per cent. sodium cellulose glycollate,
90.0 per cent. water and dried in a spray drier. The testing of 0.25 gram of this preparation as set forth above exhibits a suitable pigment dispersion in the viscose film which is not the case with the preparation which contains no sodium cellulose glycollate.

*Example 4*

A press cake of Indanthrene (about 20 per cent.) is mixed with 1.5 parts of solid sulfite cellulose waste liquor residue (calculated for 1 part of dry dyestuff pigment). The paste obtained is converted in a Werner-Pfleiderer type kneading machine with evaporation of water, into a consistent kneaded mass and kneading is continued until the dyestuff pigment exists in a fine dispersion, for example of a particle size of about 1–2μ.

A small portion of the kneaded mass, based on the dry content determination, is converted by addition of the calculated quantity of water and sulfite waste liquor into a dispersion of the following composition:

3.6 per cent. dyestuff pigment,
6.4 per cent. sulfite cellulose waste liquor (solid),
90.0 per cent. water and dried in a spray drier. Testing of 0.2 gram of the powder by the method set forth above shows that the pigment exists in the viscose film in a very coarse state of distribution.

With the major quantity of the kneaded mass by addition of water and sodium cellulose glycollate (dissolved in water) a dispersion of the following composition is produced:

3.6 per cent. dyestuff pigment,
5.4 per cent. sulfite cellulose waste liquor (solid),
1.0 per cent. sodium cellulose glycollate,
90.0 per cent. water and the dispersion is dried in a spray drier. Testing of 0.2 gram of the powder by the same method shows a very good dispersion in the viscose film.

*Example 5*

In a porcelain "Vibratom" oscillation mill using porcelain balls of diameter 12 mm. is finely ground a suspension of 10 per cent. pyranthrone (from the press cake), 10 per cent. dinaphthyl methane disodium sulfonate and 80 per cent. of water. According to the type of mill a milling duration of about 6 days may be necessary in order to obtain a particle size of 1–3μ. With a small portion of the product with addition of dinaphthylmethane disodium sulfonate and water, a dispersion of the following composition is produced:

3.33 per cent. dyestuff pigment,
6.67 per cent. dinaphthylmethane disodium sulfonate,
90.0 per cent. of water and the dispersion is dried in a spray drier. 0.36 gram of the powder obtained is tested by the above method. The viscose film exhibits coarse pigment agglomerations.

With the greater part of the product from milling by addition of dinaphthylmethane disodium sulfonate, water and an aqueous solution of sodium potato starch glycollate (degree of substitution=0.5–0.6; viscosity of a 3 per cent. aqueous solution at 25° C. by Gardner's method=3.4 poises) is produced a dispersion of the following composition:

3.33 per cent. dyestuff pigment,
5.67 per cent. dinaphthylmethane disodium sulfonate,
1.0 per cent. sodium starch glycollate,
90.0 per cent. water which is dried in a spray drier. Testing of 0.36 gram of the powder by the above method shows a good pigment dispersion in the viscose film. Equally good results are obtained with the application of sodium cellulose ethyl ether β-sulfonate or sodium cellulose glycollate instead of sodium starch glycollate.

*Example 6*

If pyranthrone is ground instead of with dinaphthyl-methane disodium sulfonate, with sodium N-benzyl-μ-heptadecyl-benzimidazole disulfonate, sodium dibutylnaphthalene sulfonate, sodium naphthenate or a condensation product from sulfonated phenol oil with urea and formaldehyde ("Tanigan extra D") and the product dried as set forth in Example 5, viscose films obtained on testing show that the dyestuff pigment is present in a bad state of distribution.

If the products from grinding are however dried after addition of the corresponding dispersing agent and sodium cellulose glycollate in a manner analogous to that set forth in Example 5 followed by testing, the viscose films obtained exhibit a considerably better dispersion of the dyestuff pigment than those corresponding films without sodium cellulose glycollate.

*Example 7*

A consistent paste is prepared from 7 parts of titanium dioxide, 2 parts of sodium dinaphthylmethane disulfonate and 1 part of sodium cellulose glycollate (in aqueous solution) and the paste is treated in a 3-roll apparatus in order to reduce coarse $TiO_2$ agglomerates.

The mass is thereupon dried in a layer of about 2 mm. in thickness in a drying apparatus and thereupon ground to a powder.

In an analogous manner a powder of the following composition was also prepared: 7 parts of titanium dioxide and 3 parts of sodium dinaphthylmethane disulfonate.

For testing 0.2 gram each of the powders produced as described were incorporated into viscose. Comparison of the viscose films shows that the product produced with sodium cellulose glycollate is present in a fine homogeneous distribution while the product prepared without this addition exhibits coarse agglomerates.

What is claimed is:

1. A dry pigment preparation suitable for direct incorporation into viscose solution, which preparation contains pigment in a dispersible form to yield on mixing with water a dispersion wherein the majority of the pigment particles have a size of less than 5μ, a quantity of a water-soluble anionic dispersing agent ranging from 20 to less than 75 per cent of the total dry weight, and also between 2 and 20 per cent of the said dry weight of such ether acid salt of a high polymeric carbohydrate as in 3 per cent aqueous solution possesses a viscosity of at least 0.5 poise at 25° C. and whose ether acid groups are selected from the class consisting of —O-alkylene-COOH and —O-alkylene-$SO_3H$ groups wherein the alkylene radical contains less than four carbon atoms.

2. A dry pigment preparation suitable for direct incorporation into viscose solution, which preparation contains pigment in a dispersible form to yield on mixing with water a dispersion wherein the majority of the pigment particles have a size of less than 5μ, a quantity of a water-soluble anionic dispersing agent ranging from 20 to less than 75 per cent of the total dry weight, and also between 5 and 10 per cent of the said dry weight of such ether acid salt of a high polymeric carbohydrate as in 3 per cent aqueous solution possesses a viscosity of at least 0.5 poise at 25° C. and whose ether acid groups are selected from the class consisting of —O-alkylene-COOH and —O-alkylene-$SO_3H$ groups wherein the alkylene radical contains less than four carbon atoms.

3. A dry pigment preparation suitable for direct incorporation into viscose solution, which preparation contains pigment in a dispersible form to yield on mixing with water a dispersion wherein the majority of the pigment particles have a size of less than 5μ, a quantity of a water-soluble anionic dispersing agent ranging from 20 to less than 75 per cent of the total dry weight, and also between 2 and 20 per cent of the said dry weight of such alkyl ether carboxylic acid salt of a high polymeric carbohydrate as in 3 per cent aqueous solution possesses a viscosity of at least 0.5 poise at 25° C. and whose alkyl ether carboxylic acid groups correspond to the formula O-alkylene-COOH wherein the alkylene radical contains less than four carbon atoms.

4. A dry pigment preparation suitable for direct incorporation into viscose solution, which preparation contains pigment in a dispersible form to yield on mixing with water a dispersion wherein the majority of the pigment particles have a size of less than 5μ, a quantity of a water-soluble anionic dispersing agent ranging from 20 to less than 75 per cent of the total dry weight, and also between 2 and 20 per cent of the said dry weight of such alkyl ether sulfonic acid salt of a high polymeric carbohydrate as in 3 per cent aqueous solution possesses a viscosity of at least 0.5 poise at 25° C. and whose alkyl ether sulfonic acid groups correspond to the formula O-alkylene-$SO_3H$ wherein the alkylene radical contains less than four carbon atoms.

5. A dry pigment preparation suitable for direct incorporation into viscose solution, which preparation contains pigment in a dispersible form to yield on mixing with water a dispersion wherein the majority of the pigment particles have a size of less than 5μ, a quantity of a water-soluble anionic dispersing agent ranging from 20 to less than 75 per cent of the total dry weight, and also between 5 and 10 per cent of the said dry weight of such alkyl ether carboxylic acid salt of a high polymeric carbohydrate as in 3 per cent aqueous solution possesses a viscosity of at least 0.5 poise at 25° C. and whose alkyl ether carboxylic acid groups correspond to the formula O-alkylene-COOH wherein the alkylene radical contains less than four carbon atoms.

6. A dry pigment preparation suitable for direct incorporation into viscose solution, which preparation contains pigment in a dispersible form to yield on mixing with water a dispersion wherein the majority of the pigment particles have a size of less than 5µ, a quantity of a water-soluble anionic dispersing agent ranging from 20 to less than 75 per cent of the total dry weight, and also between 5 and 10 per cent of the said dry weight of such alkyl ether sulfonic acid salt of a high polymeric carbohydrate as in 3 per cent aqueous solution possesses a viscosity of at least 0.5 poise at 25° C. and whose alkyl ether sulfonic acid groups correspond to the formula O-alkylene-SO₃H wherein the alkylene radical contains less than four carbon atoms.

7. A dry pigment preparation suitable for direct incorporation into viscose solution, which preparation contains pigment in a dispersible form to yield on mixing with water a dispersion wherein the majority of the pigment particles have a size of less than 5µ, a quantity of a water-soluble anionic dispersing agent ranging from 40 to less than 75 per cent of the total dry weight, and also between 2 and 20 per cent of the said dry weight of such alkyl ether carboxylic acid salt of a high polymeric carbohydrate as in 3 per cent aqueous solution possesses a viscosity of at least 0.5 poise at 25° C. and whose alkyl ether carboxylic acid groups correspond to the formula O-alkylene-COOH wherein the alkylene radical contains less than four carbon atoms.

8. A dry pigment preparation suitable for direct incorporation into viscose solution, which preparation contains pigment in a dispersible form to yield on mixing with water a dispersion wherein the majority of the pigment particles have a size of less than 5µ, a quantity of a water-soluble anionic dispersing agent ranging from 40 to less than 75 per cent of the total dry weight, and also between 2 and 20 per cent of the said dry weight of such alkyl ether sulfonic acid salt of a high polymeric carbohydrate as in 3 per cent aqueous solution possesses a viscosity of at least 0.5 poise at 25° C. and whose alkyl ether sulfonic acid groups correspond to the formula O-alkylene-SO₃H wherein the alkylene radical contains less than four carbon atoms.

9. A dry pigment preparation suitable for direct incorporation into viscose solution, which preparation contains pigment in a dispersible form to yield on mixing with water a dispersion wherein the majority of the pigment particles have a size of less than 5µ, a quantity of dinaphthylmethane disodium sulfonate ranging from 40 to less than 75 per cent of the total dry weight, and also between 2 and 20 per cent of the said dry weight of water-soluble cellulose glycollate.

10. A dry pigment preparation suitable for direct incorporation into viscose solution, which preparation contains pigment in a dispersible form to yield on mixing with water a dispersion wherein the majority of the pigment particles have a size of less than 5µ, a quantity of dinaphthylmethane disodium sulfonate ranging from 40 to less than 75 per cent of the total dry weight, and also between 2 and 20 per cent of the said dry weight of water-soluble cellulose ethyl ether sulfonic acid salt.

11. A dry pigment preparation suitable for direct incorporation into viscose solution which preparation contains pigment in a dispersible form to yield on mixing with water a dispersion wherein the majority of the pigment particles have a size of less than 5µ, a quantity of dinaphthylmethane disodium sulfonate ranging from 40 to less than 75 per cent of the total dry weight, and also between 2 and 20 per cent of the said dry weight of water-soluble starch glycollate.

12. In a process for the manufacture of a pigment preparation, the step which consists in spray drying a pigment dispersion containing the pigment in such finely dispersed form that the majority of the particles have a size of less than 5µ, further containing a quantitiy of a water-soluble anionic dispersing agent ranging from 20 to less than 75 per cent of the total dry weight, and also between 2 and 20 per cent of the total dry weight of such alkyl ether acid salt of a high polymeric carbohydrate as in 3 per cent aqueous solution possesses a viscosity of at least 0.5 poise at 25° C. and whose ether acid groups are selected from the class consisting of —O-alkylene-COOH and —O-alkylene-SO₃H groups wherein the alkylene radical contains less than four carbon atoms.

13. In a process for the manufacture of a pigment preparation, the step which consists in spray drying a pigment dispersion containing the pigment in such finely dispersed form that the majority of the particles have a size of less than 5µ, further containing a quantity of a water-soluble anionic dispersing agent ranging from 20 to less than 75 per cent of the total dry weight, and also between 2 and 20 per cent of the total dry weight of such alkyl ether carboxylic acid salt of a high polymeric carbohydrate as in 3 per cent aqueous solution possesses a viscosity of at least 0.5 poise at 25° C. and whose ether acid groups correspond to the formula —O-alkylene-COOH wherein the alkylene radical contains less than four carbon atoms.

14. In a process for the manufacture of a pigment preparation, the step which consists in spray drying a pigment dispersion containing the pigment in such finely dispersed form that the majority of the particles have a size of less than 5µ, further containing a quantity of a water-soluble anionic dispersing agent ranging from 20 to less than 75 per cent of the total dry weight, and also between 2 and 20 per cent of the total dry weight of such alkyl ether sulfonic acid salt of a high polymeric carbohydrate as in 3 per cent aqueous solution possesses a viscosity of at least 0.5 poise at 25° C. and whose ether acid groups correspond to the formula —O-alkylene-SO₃H wherein the alkylene radical contains less than four carbon atoms.

15. In a process for the manufacture of a pigment preparation, the step which consists in spray drying a pigment dispersion containing the pigment in such finely dispersed form that the majority of the particles have a size of less than 5μ, further containing a quantity of dinaphthylmethane disodium sulfonate ranging from 20 to less than 75 per cent of the total dry weight and also between 2 and 20 per cent of the total dry weight of water-soluble cellulose glycollate.

16. The process for coloring viscose solution which comprises directly incorporating into viscose solution a dry pigment preparation according to claim 1.

17. The process for coloring viscose solution which comprises directly incorporating into viscose solution a dry pigment preparation according to claim 9.

References Cited in the file of this patent

UNITED STATES PATENTS

| Number | Name | Date |
|---|---|---|
| 1,430,061 | Deeks | Sept. 26, 1922 |
| 1,979,469 | Johnson | Nov. 6, 1934 |
| 2,145,580 | Bley | Jan. 31, 1939 |
| 2,155,326 | O'Brien | Apr. 18, 1939 |
| 2,231,468 | Hanahan | Feb. 11, 1941 |